US012649373B2

(12) United States Patent
Chen et al.

(10) Patent No.: US 12,649,373 B2
(45) Date of Patent: Jun. 9, 2026

(54) SYSTEMS AND METHODS FOR CONTROLLING ENERGY EFFICIENCY OF ELECTRIC DRIVE SYSTEMS

(71) Applicants: Hyundai Motor Company, Seoul (KR); Kia Corporation, Seoul (KR)

(72) Inventors: Yue Ming Chen, Ypsilanti, MI (US); Brian Link, Webster Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 132 days.

(21) Appl. No.: 18/607,195

(22) Filed: Mar. 15, 2024

(65) Prior Publication Data

US 2025/0289323 A1 Sep. 18, 2025

(51) Int. Cl.
| | |
|---|---|
| B60L 15/20 | (2006.01) |
| B60K 11/02 | (2006.01) |
| B60W 40/12 | (2012.01) |
| B60W 50/00 | (2006.01) |
| F01P 3/12 | (2006.01) |

(52) U.S. Cl.
CPC ......... B60L 15/2045 (2013.01); B60W 40/12 (2013.01); B60W 50/0097 (2013.01); F01P 3/12 (2013.01); B60K 11/02 (2013.01); B60W 2420/403 (2013.01); B60W 2420/408 (2024.01); B60W 2510/081 (2013.01); (Continued)

(58) Field of Classification Search
CPC ................ B60K 11/02; B60L 15/2045; B60W 2420/403; B60W 2420/408; B60W 2510/081; B60W 2510/083; B60W 2510/087; B60W 2552/15; B60W 2555/60; B60W 40/12; B60W 50/0097; F01P 3/12
See application file for complete search history.

(56) References Cited

U.S. PATENT DOCUMENTS 9,114,794 B2 * 8/2015 King ......................... B60L 1/00
11,186,173 B2 * 11/2021 Koebler .................. B60L 58/12
(Continued)

FOREIGN PATENT DOCUMENTS

CA 2967302 C * 4/2019 ............. G08G 1/095
CN 113246951 A * 8/2021 ............. B60W 10/08
(Continued)

*Primary Examiner* — Babar Sarwar
(74) *Attorney, Agent, or Firm* — Fox Rothschild LLP

(57) ABSTRACT

Systems and methods for controlling vehicle energy efficiency are provided. The system may comprise an ADAS, a navigation sensor configured to collect navigation data, and an electric drive cooling system, comprising a powertrain controller, comprising a processor and a memory, one or more electric motors (EMs), one or more power electronics (PEs), and a temperature control system. The processor may be configured to determine a vehicle route, dissect the route into a plurality of segments, calculate a travel time for each segment, divide the travel time into a number of prediction steps, forming a prediction horizon, establish one or more road conditions, estimate EM motor speed and torque, and estimate a temperature profile for the EMs and PEs across the prediction horizon, and determine one or more control inputs to cause the one or more EMs and the one or more PEs to function within a desired temperature range.

16 Claims, 6 Drawing Sheets

(52) U.S. Cl.
   CPC . *B60W 2510/083* (2013.01); *B60W 2510/087*
   (2013.01); *B60W 2552/15* (2020.02); *B60W*
   *2555/60* (2020.02)

(56) References Cited

U.S. PATENT DOCUMENTS

| | | | | |
|---|---|---|---|---|
| 11,602,999 | B1 * | 3/2023 | Flatland | G05D 1/0217 |
| 2012/0041627 | A1 * | 2/2012 | Kelty | B60L 15/2045 |
| | | | | 701/22 |
| 2015/0274030 | A1 * | 10/2015 | Payne | G01C 21/3461 |
| | | | | 903/903 |
| 2020/0062126 | A1 * | 2/2020 | Duan | B60L 58/25 |
| 2022/0176939 | A1 * | 6/2022 | Poll | B60W 10/26 |
| 2024/0375635 | A1 * | 11/2024 | Ludovici | B60W 10/119 |
| 2024/0413424 | A1 * | 12/2024 | Vuylsteke | H01M 10/635 |

FOREIGN PATENT DOCUMENTS

| | | | | | |
|---|---|---|---|---|---|
| EP | 3147154 | A2 * | 3/2017 | | B60W 30/18118 |
| JP | 2004-324613 | A | 11/2004 | | |
| JP | 4400296 | B2 | 1/2010 | | |
| JP | 4802715 | B2 * | 10/2011 | | |
| WO | WO-2013108246 | A2 * | 7/2013 | | B60L 15/2045 |
| WO | WO-2024000400 | A1 * | 1/2024 | | B60L 58/16 |

* cited by examiner

SYSTEMS AND METHODS FOR CONTROLLING ENERGY EFFICIENCY OF ELECTRIC DRIVE SYSTEMS

BACKGROUND

Technical Field

Embodiments of the present disclosure relate to systems and methods for controlling energy efficiency of electric drive systems.

Background

Temperature can affect the functionality of the systems of electric vehicles (EVs). Due to the affect of temperature on these systems, EVs have an optimum operating temperature. When an EV is not operated at the optimum operating temperature, efficiency and vehicle range are reduced.

In particular, with current EV powertrain systems, the efficiency of electric motors and power electronics decreases either under low-speed/high-torque driving conditions or under high-speed/low-torque driving conditions. Since the efficiency of power electronics (PEs) and electric motors (EMs) is temperature dependent, when power electronics and electric motors are running in less efficient regions, the EV range is reduced, and controlling the temperature of the PEs and EMs is crucial to improve energy efficiency.

Currently, temperature regulation in EVs is designed to prevent EMs or inverters from overheating under high load driving conditions by lowering the coolant or oil temperature before high load demand (e.g., before driving uphill). However, these temperature regulation systems and methods do not perform thermal management using electric coolant pumps (e.g., electric water pumps (EWPs)) or electric oil pumps (EOPs) with cooling fan and active air flaps, do not provide detailed control methodologies, and not be able to minimize power losses of the PEs and EMs.

SUMMARY

According to an object of the present disclosure, a system for controlling vehicle energy efficiency is provided. The system may comprise an advanced driver assistance system (ADAS), comprising one or more imaging sensors, configured to image an environment of a vehicle. The system may comprise a navigation sensor configured to collect navigation data pertaining to the vehicle, and an electric drive cooling system, comprising a powertrain controller, comprising a processor and a memory, one or more electric motors (EMs), one or more power electronics (PEs), and a temperature control system configured to adjust a temperature of the one or more EMs and the one or more PEs. The memory may be configured to store instructions that, when executed by the processor, cause the processor to determine a route of the vehicle, dissect the route of the vehicle into a plurality of segments, calculate a travel time for each segment of the plurality of segments, divide the travel time into a number of prediction steps, the prediction steps forming a prediction horizon, establish one or more road conditions across the prediction horizon, based on the navigation data, estimate EM motor speed and torque across the prediction horizon, based on the one or more road conditions, estimate a temperature profile for the one or more EMs and the one or more PEs across the prediction horizon, based on the estimated EM motor speed and torque, and determine one or more control inputs to the temperature control system to cause the one or more EMs and the one or more PEs to function within a desired temperature range.

According to an exemplary embodiment, the one or more imaging sensors may comprise one or more imaging sensors selected from the following: one or more cameras; one or more LiDAR sensors; and one or more radar sensors.

According to an exemplary embodiment, the navigation data may comprise future road gradient and speed limit data for the vehicle.

According to an exemplary embodiment, the one or more road conditions may comprise the future road gradient and speed limit data.

According to an exemplary embodiment, the instructions, when executed by the processor, may be further configured to cause the processor to determine whether the navigation data is valid to be used for predictive control.

According to an exemplary embodiment, the temperature control system may comprise one or more temperature control apparatuses selected from the following: one or more coolant pumps; one or more motor oil coolers; one or more electric oil pumps; one or more water condensers; one or more radiators; one or more 3-way valves; one or more cooling fans; and one or more active air flappers (AAFs).

According to an exemplary embodiment, determining the one or more control inputs may comprise, when a coolant temperate of a coolant passing through a 3-way valve, of the one or more 3-way valves, is above a temperature threshold, determining a control input to open the 3-way valve and allow coolant to pass through and into a radiator, of the one or more radiators, lowering the coolant temperature.

According to an exemplary embodiment, the determining the one or more control inputs may comprise determining a control input to activate the cooling fan and the AAF to regulate coolant temperature of a coolant.

According to an exemplary embodiment, the route of the vehicle may be based on data from the ADAS and the navigation data.

According to an exemplary embodiment, the system may further comprise the vehicle.

According to an exemplary embodiment, the ADAS, the navigation sensor, and the electric drive cooling system may be coupled to the vehicle.

According to an object of the present disclosure, a method for controlling vehicle energy efficiency is provided. The method may comprise imaging an environment of a vehicle using an ADAS, comprising one or more imaging sensors, collecting, using a navigation sensor, navigation data pertaining to the vehicle, and, using an electric drive cooling system, determining a route of the vehicle, dissecting the route of the vehicle into a plurality of segments, calculating a travel time for each segment of the plurality of segments, dividing the travel time into a number of prediction steps, the prediction steps forming a prediction horizon, establishing one or more road conditions across the prediction horizon, based on the navigation data, estimating EM motor speed and torque across the prediction horizon, based on the one or more road conditions, estimating a temperature profile for one or more EMs and one or more PEs across the prediction horizon, based on the estimated EM motor speed and torque; and determining one or more control inputs to the temperature control system to cause the one or more EMs and the one or more PEs to function within a desired temperature range. The electric drive cooling system may comprise a powertrain controller, comprising a processor and a memory, the one or more EMs, the one or more PEs, and a temperature control system configured to adjust a temperature of the one or more EMs and the one or more PEs.

According to an exemplary embodiment, the one or more imaging sensors may comprise one or more imaging sensors selected from the following; one or more cameras; one or more LiDAR sensors; and one or more radar sensors.

According to an exemplary embodiment, the navigation data may comprise future road gradient and speed limit data for the vehicle.

According to an exemplary embodiment, the one or more road conditions may comprise the future road gradient and speed limit data.

According to an exemplary embodiment, the method may comprise, using the electric drive cooling system, determining whether the navigation data is valid to be used for predictive control.

According to an exemplary embodiment, the temperature control system may comprise one or more temperature control apparatuses selected from the following: one or more coolant pumps; one or more motor oil coolers; one or more electric oil pumps; one or more water condensers; one or more radiators; one or more 3-way valves; one or more cooling fans; and one or more AAFs.

According to an exemplary embodiment, the determining the one or more control inputs may comprise, when a coolant temperate of a coolant passing through a 3-way valve, of the one or more 3-way valves, is above a temperature threshold, determining a control input to open the 3-way valve and allow coolant to pass through and into a radiator, of the one or more radiators, lowering the coolant temperature.

According to an exemplary embodiment, the determining the one or more control inputs may comprise determining a control input to activate the cooling fan and the AAF to regulate coolant temperature of a coolant.

According to an exemplary embodiment, the route of the vehicle may be based on data from the ADAS and the navigation data.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
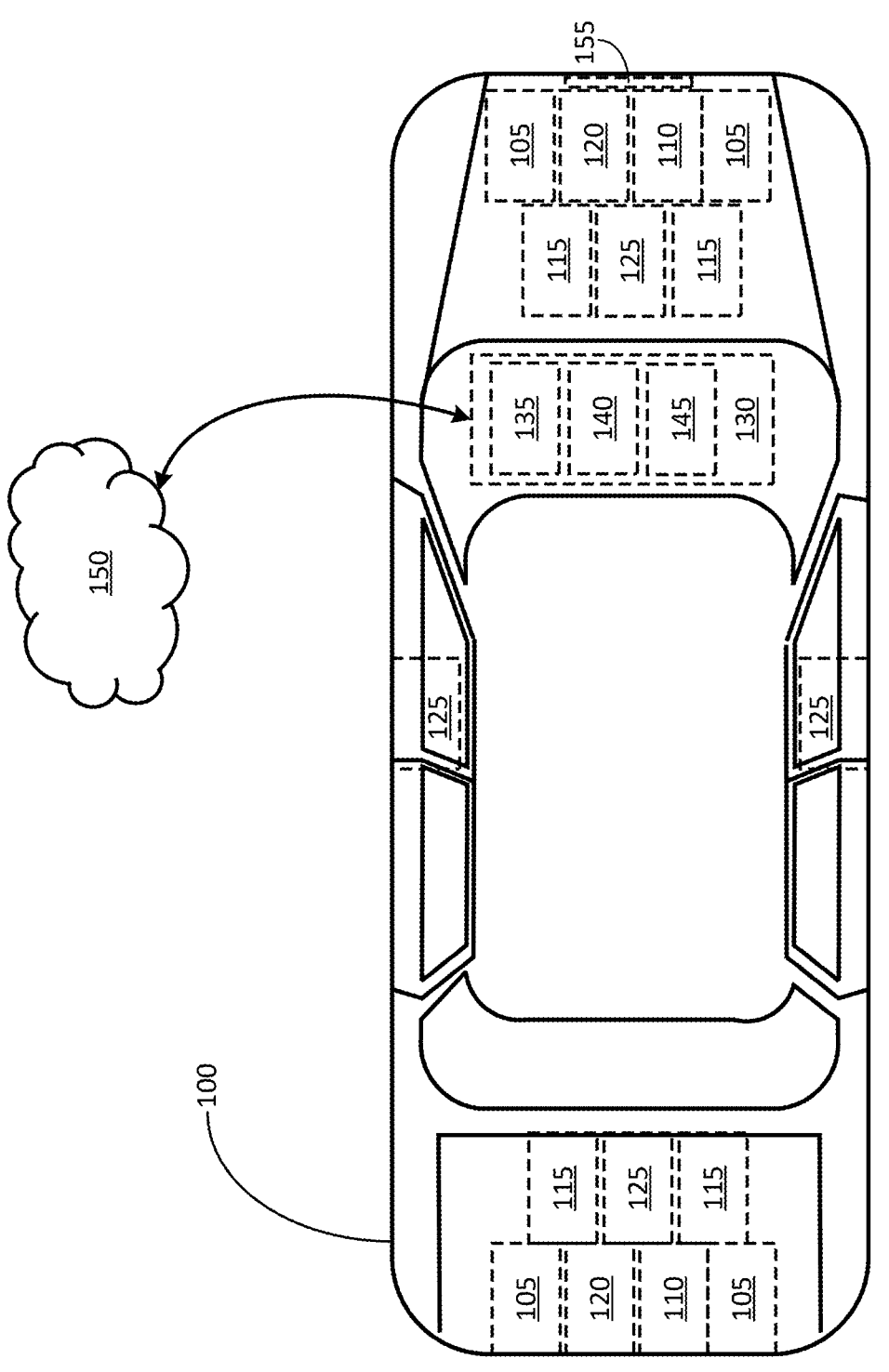
FIG. 1 illustrates a vehicle configured for controlling vehicle energy efficiency, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

The actual range of a battery electric vehicle (BEV) is highly influenced by external/environmental conditions, such as, e.g., temperature, wind, road conditions (e.g., road material, smoothness, etc.), speed, whether the BEV is climbing or descending hills, whether the BEV is towing, and and/or other conditions. One of the top complaints of BEVs is the range of the BEV. Many customers experience range anxiety, especially when the vehicle range drops rapidly while, e.g., climbing a hill or in a head wind condition. These and other conditions may be accounted for by using, e.g., an onboard camera and radar systems from, e.g., an advanced driver assistance system (ADAS).

According to exemplary embodiments, systems and methods for controlling energy efficiency of electric drive systems are provided. According to an exemplary embodiment, the systems and methods of the present disclosure are configured to improve the ability of electric motors to operate at optimum operating temperatures to increase the range of electric vehicles (EVs) (e.g., BEVs). Since power electronics (PEs) and electric motors (EMs) are running more efficiently and consuming less power, the systems and methods of the present disclosure increase the electric driving range.

According to an exemplary embodiment, based on navigation look-ahead data, a target temperature of PEs and EMs may be determined, according to temperature-dependent efficiency maps, to achieve maximum efficiency. Therefore, the systems and methods of the present disclosure are able to achieve improved electric drive system efficiency by running the PEs and EMs at higher efficiency and more effectively converting electrical energy to power. This reduces power losses and thermal stresses on the PEs and EMs. As a result, this greatly increases the lifetime and the reliability of the PEs and EMs, reducing overall power consumption and replacement costs.

In addition, since less battery energy is consumed to power the PEs and EMs, the electric driving range is increased, and, since the efficiency of PEs and EMs is temperature-dependent, controlling the temperature of the PEs and EMs is crucial to achieve energy efficiency controlled by a predictive controller. For PEs, electronics junction and heat sink temperatures may be used to directly indicate if the PEs are operating efficiently, since increased efficiency reduces the power required to operate the PEs. For EMs, motor magnet and winding temperatures may be used to directly indicate if an EM is running at high efficiency. Therefore, increased efficiency reduces the power required to operate an EM.

Under high-speed/low-load driving conditions, higher coil temperatures are desirable. Therefore, the predictive controller may be configured to promote heating of the system to save energy by running pumps at their minimum speed while keeping a grille shutter closed and a cooling fan off. This greatly increases the lifetime and the reliability of the pumps and fan, reduces overall power consumption and replacement cost, and also decreases the noise of the system.

Since charging the battery is less frequent while using the systems and methods of the present disclosure, due to higher efficiency of the electric drive cooling system, the lifetime and the reliability of the PEs and charger hardware is greatly increases, reducing life cycle costs.

With the availability of GPS or other navigation technology to detect driving conditions and upcoming road grade information, predictive control software of the present systems and methods may be configured to continuously monitor driving conditions and maximize efficiency of the electric drive cooling system without costly major changes to the existing thermal hardware design, which may optimize electric drive cooling system energy efficiency and maximize EV range.

Referring now to FIG. 1, a vehicle 100 configured for controlling vehicle energy efficiency is illustratively depicted, in accordance with an exemplary embodiment of the present disclosure. According to an exemplary embodiment, the vehicle 100 may comprise an EV (e.g., a BEV).

According to an exemplary embodiment, the vehicle 100 may comprise one or more sensors such as, for example, one or more LiDAR sensors 105, one or more radio detection and ranging (RADAR) sensors 110, one or more cameras 115, one or more position determining sensors 120 (e.g., one or more Global Positioning System devices and/or other suitable navigation sensors), and/or one or more temperature sensors 125 (e.g., thermometers), among other suitable sensors. According to an exemplary embodiment, the one or more sensors may be in electronic communication with one or more computing devices 130. The one or more computing devices 130 may be separate from the one or more sensors and/or may be incorporated into the one or more sensors. According to an exemplary embodiment, the one or more sensors may comprise one or more imaging sensors (e.g., the one or more LiDAR sensors 105, the one or more cameras 115, the one or more radar sensors 110, and/or other suitable imaging sensors) configured to function as an ADAS. According to an exemplary embodiment, the ADAS may be configured to image an environment of the vehicle 100 (e.g., an environment in which the vehicle 100 is located), generating environmental data. According to an exemplary embodiment, one or more model-based temperature estimations may be used to determine temperature, in conjunction with, or instead of, the one or more temperature sensors 125.

According to an exemplary embodiment, the computing device 130 may comprise a processor 135, a memory 140, and/or a user interface 145 (e.g., a graphical user interface). The computing device 130 may be configured to send and/or receive commands/data/etc. via one or more external systems via wired and/or wireless connection (e.g., via the cloud 150). The memory 140 may be configured to store programming instructions that, when executed by the processor 135, may be configured to cause the processor 135 to perform one or more tasks such as, e.g., receiving one or more inputs from one or more sensors (e.g., one or more LiDAR sensors 105, one or more cameras 115, one or more radar sensors 110, one or more position determining sensors 120, one or more temperature sensors 125, and/or other suitable sensors), predict road conditions (e.g., a location of the road, one or more obstacles/objects within the road, a road surface condition of the road, and/or other relevant road conditions) ahead of the vehicle 100 using the ADAS and one or more position determining sensors 120 of the vehicle 100 (especially for low-speed/high-torque and/or high-speed/low-torque driving conditions), and/or perform other suitable tasks.

According to an exemplary embodiment, the computing device 130 may be configured to predict the road conditions by, e.g., sensing a host vehicle 100 position, determining the speed limit and/or other road information of the road, determining a road gradient (e.g., uphill, flat, downhill, etc.), and/or via other suitable analyses. According to an exemplary embodiment, based on the input data (e.g. speed limit and road gradient) from the one or more position determining sensors 120, the information may be processed (using, e.g., the computing device 130) and future power demands for power electronics (PEs) and electric motors (EMs) of the vehicle 100 may be estimated to predict a future trajectory of vehicle thermal behavior.

According to an exemplary embodiment, the programming instructions, when executed by the processor 135, may be configured to cause the processor 135 to use look-up table(s) and/or use model-based predictive control to control a temperature of the PEs and EMs, such as an inverter and a motor coil, in a desired range so as to minimize power losses when the PEs and EMs will be operating in less efficient regions. As a result, during low-speed/high-torque and/or high-speed/low-torque driving periods, the PEs, EMs, oil temperature, and coolant temperature may be controlled by an electric water pump (EWP) and/or electric oil pump (EOP) as close as possible to desired levels to yield improved energy efficiency. According to an exemplary embodiment, the programming instructions, when executed by the processor 135, may be configured to cause the processor 135 to control one or more cooling fans and/or active grille shutters to improve heat transfer and reduce aerodynamic drag. By controlling the cooling fan 250 and active grille shutter 155 to improve heat transfer and reduce aerodynamic drag, the efficiency of the electric drive cooling system may be further improved and the driving range may be maximized.

Figure 2:
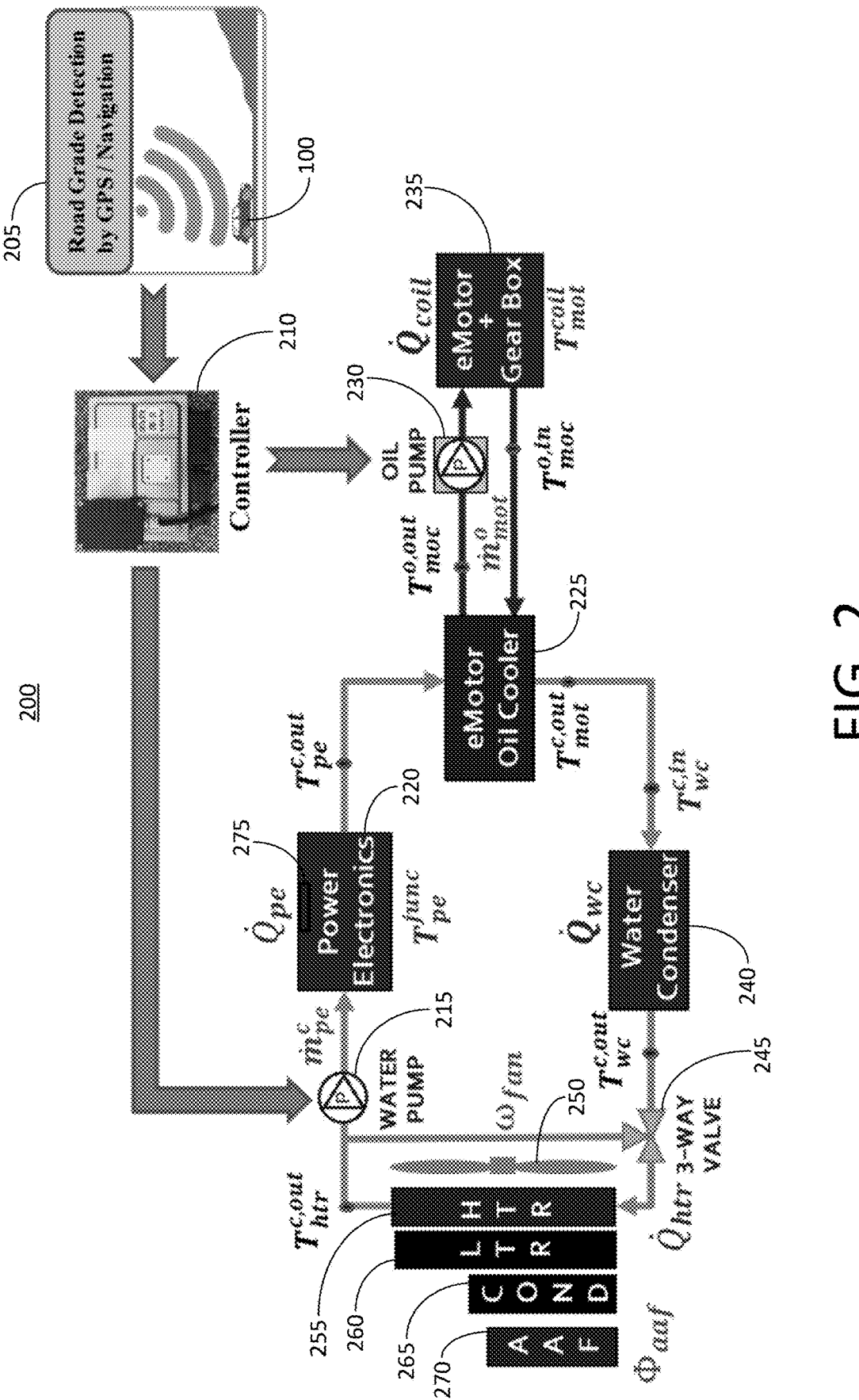
FIG. 2 illustrates an electric drive cooling system integrated with navigation data, according to an exemplary embodiment of the present disclosure.

Referring now to FIG. 2, an electric drive cooling system 200, integrated with navigation data 205 from the one or more position determining sensors 120 is illustratively depicted, in accordance with an exemplary embodiment of the present disclosure. The electric drive cooling system 200 may be configured for use in/with, and/or may be a component of, vehicle 100. According to an exemplary embodiment, the computing device 130 may be configured to detect and analyze one or more speed limit signs (and/or other suitable signage), using the one or more cameras 115 in order to determine one or more speed limits listed on the one or more speed limit signs. According to an exemplary embodiment, the computing device 130 may be configured to compare a speed limit on a speed limit sign against speed limit data from the navigation data 205.

According to the example configuration shown in FIG. 2, $$T_{pe}^{c,out}$$

is a power electronics 220 outlet coolant temperature, $$T_{mot}^{c,out}$$

is an electric motors 235 outlet coolant temperature, $$T_{wc}^{c,out}$$

is a water condenser 240 outlet coolant temperature, and $$T_{htr}^{c,out}$$

is a radiator 255 outlet coolant temperature. In addition, $\omega_{fan}$ is a cooling fan 250 speed, $\Phi_{aaf}$ is an active air flapper (AAF) 270 position, $\dot{Q}_i$ is heat flow, $$T_{pe}^{junc}$$

is a power electronics 220 junction temperature, $$T_{mot}^{coil}$$

is a motor coil temperature, $$T_{moc}^{o}$$

is an oil temperature, $$\dot{m}_{pe}^{c}$$

is a coolant mass flow rate, and $$\dot{m}_{mot}^{o}$$

is an oil mass flow rate.

According to an exemplary embodiment, the electric drive cooling system 200 may be integrated with GPS/Navigation data 205. In such a layout, the one or more position determining sensors 120 may be configured to provide instantaneous and future road gradient and speed limit data that serve as inputs to a prediction processor e.g., processor 135) inside a powertrain controller 210. According to an exemplary embodiment, the powertrain controller 210 may comprise a computing device (e.g., computing device 130, computing device 500).

According to an exemplary embodiment, the electric drive cooling system 200 may comprise one or more EMs 235 and/or PEs 220 of a vehicle 100 (e.g., an electric vehicle (EV)), one or more electric coolant pumps (EWPs) (e.g., water pump 215), one or more motor oil coolers 225, one or more electric oil pumps (EOPs) 230, one or more water condensers 240, one or more 3-way electric flow control valves 245, one or more high temperature radiators (HTRs) 255, one or more low temperature radiators (LTRs) 260, one or more cooling fans 250 behind the HTR 255, one or more active air flappers (AAFs) 270, an A/C condenser 265, and/or a reservoir, among other suitable components. According to an exemplary embodiment, one or more of the one or more EWPs 215, one or more motor oil coolers 225, one or more EOPs 230, one or more water condensers 240, one or more 3-way electric flow control valves 245, one or more HTRs 255, one or more LTRs 260, one or more cooling fans 250, one or more AAFs 270, and/or reservoirs, among other suitable components, may form one or more temperature control apparatuses of a temperature control system.

According to an exemplary embodiment, the water pump 215 may be configured to circulate coolant to the power electronics and electric motors PEs 220 and EMs 235. Liquid cold plates 275 of the PEs 220 may be configured to provide localized cooling of the PEs 220 by, e.g., transferring heat to coolant that then flows to a radiator 255 and dissipates the heat to air.

According to an exemplary embodiment, the EMs 235 may be configured to be cooled by an oil cooler 225. According to an exemplary embodiment, the electric drive cooling system 200 may comprise a colder temperature water circuit for cooling motor oil and a hotter temperature oil circuit for cooling copper winding in the EM and gear box 235. Heat may be exchanged between these two circuits to achieve an operating temperature for the EM 235.

According to an exemplary embodiment, the coolant leaving the pump 215 flows through the cooling plates 275 and oil coolers 225, then into heat exchangers in the system 200 and finally back to the pump 215. This cycle may be configured to continue/repeat as is required/necessary/desired.

According to an exemplary embodiment, when the coolant passing through the 3-way valve 245 is above a temperature threshold, the controller 210 may be configured to open the 3-way valve 245 and allow coolant to pass through and into the radiator 255 in order to lower the coolant temperature. According to an exemplary embodiment, the radiator cooling fan 250 and the AAF 270 may be configured to be activated to regulate coolant temperature.

According to an exemplary embodiment, based on comparisons between EM 235 speed (rpm) and EM 235 torque (Nm), it has been found that lower coil temperatures are beneficial for high load operations at low speeds, leading to potential decreases in EM 235 power losses. Additionally, higher coil temperatures have been found to be desirable in low load operations at medium to high speeds, such as during constant highway driving on flat road or downhill, as there is a potential energy savings. According to an exemplary embodiment, the prediction processor (e.g., processor 135) may be configured to control the temperature of PEs 220 and EMs 235, such as, e.g., the temperatures of the inverter and motor coil, in the desired range during the low-speed/high-torque or high-speed/low-torque driving conditions so as to minimize electric drive cooling system 200 power losses by commanding optimal 215 speed, EOP 230 speed, cooling fan 250 speed, and AAF 270 position.

Equations 1-5 illustrate examples of physics-based thermal models of the electric drive cooling system 200 that may be used to represent a relevant system's transient thermal behavior.

$$M_{coil}c_{p,coil}\dot{T}_{coil} = -h_{coil2o}A_{coil2o}\left(T_{coil} - \frac{T_{o,mot}^{in} + T_{o,mot}^{out}}{2}\right) + \dot{Q}_{coil} \qquad \text{Equation 1}$$

$$M_{o,mot}c_{p,o}\dot{T}_{o,mot}^{out} = \qquad \text{Equation 2}$$

$$h_{coil2o}A_{coil2o}\left(T_{coil} - \frac{T_{o,mot}^{in} + T_{o,mot}^{out}}{2}\right) - \dot{m}_{o}c_{p,o}\left(T_{o,mot}^{in} - T_{o,mot}^{out}\right)$$

$$M_{inv}c_{p,inv}\dot{T}_{inv} = -h_{inv2c}A_{inv2c}\left(T_{coil} - \frac{T_{c,inv}^{in} + T_{c,inv}^{out}}{2}\right) + \dot{Q}_{inv} \qquad \text{Equation 3}$$

$$M_{c,inv}c_{p,c}\dot{T}_{c,inv}^{out} = \qquad \text{Equation 4}$$

$$h_{inv2o}A_{inv2o}\left(T_{inv} - \frac{T_{c,inv}^{in} + T_{c,inv}^{out}}{2}\right) - \dot{m}_{c}c_{p,c}\left(T_{c,htr}^{in} - T_{c,inv}^{out}\right)$$

$$M_{c,HX}c_{p,c}\dot{T}_{c,htr}^{in} = -\dot{Q}_{htr} - \dot{Q}_{wc} + \dot{m}_{c}c_{p,c}\left(T_{c,wc}^{in} - T_{c,htr}^{out}\right) \qquad \text{Equation 5}$$

According to an exemplary embodiment, model-based predictive control may be used as an optimal-control based method to determine the control actions by minimizing a cost function which is energy consumption minimization.

The prediction model, by assuming the coolant and motor oil are at a quasi-steady state, the heat transfer rate at the EM 235, oil cooler 225, PEs 220, water condenser 240, and HTR 255 may be formulated with five static energy balance equations (Equations 1-5), where the five state variables are $$T_{coil}, T_{o,mot}^{out}, T_{inv}, T_{c,inv}^{out}, \text{ and } T_{c,htr}^{out},$$

which are, respectively, motor coil temperature, oil temperature at the motor oil channel outlet, inverter temperature, coolant temperature at the inverter coolant channel outlet, and coolant temperature at the radiator outlet. The two control variables, $\dot{m}_{c}$ and $\dot{m}_{o}$, are the coolant mass flow rate and the oil mass flow rate.

According to an exemplary embodiment, a cost function (Equation 6) may be used.

$$J = \qquad \text{Equation 6}$$

$$\sum_{k=1}^{N} P_{mot,loss,k} + P_{inv,loss,k} + P_{ewp,k} + P_{eop,k} + w_{ewp}\Delta\dot{m}_{c}^{2} + w_{eop}\Delta\dot{m}_{o}^{2}$$

The cost function may be designed to serve two main objectives: (1) to minimize the power losses of the motor and inverter; and (2) to minimize the power consumptions of the coolant pump 215 and the oil pump 230, where $P_{mot,loss,k}$ is the motor power loss, $P_{inv,loss,k}$ is the inverter power loss, $P_{eop,k}$ is the coolant pump power consumption, $P_{ewp,k}$ is the oil pump power consumption, and $$w_{ewp}\Delta\dot{m}_c^2 \text{ and } w_{eop}\Delta\dot{m}_o^2$$

are cost terms to minimize control maneuvers and to suppress control oscillations.

Figure 3A:
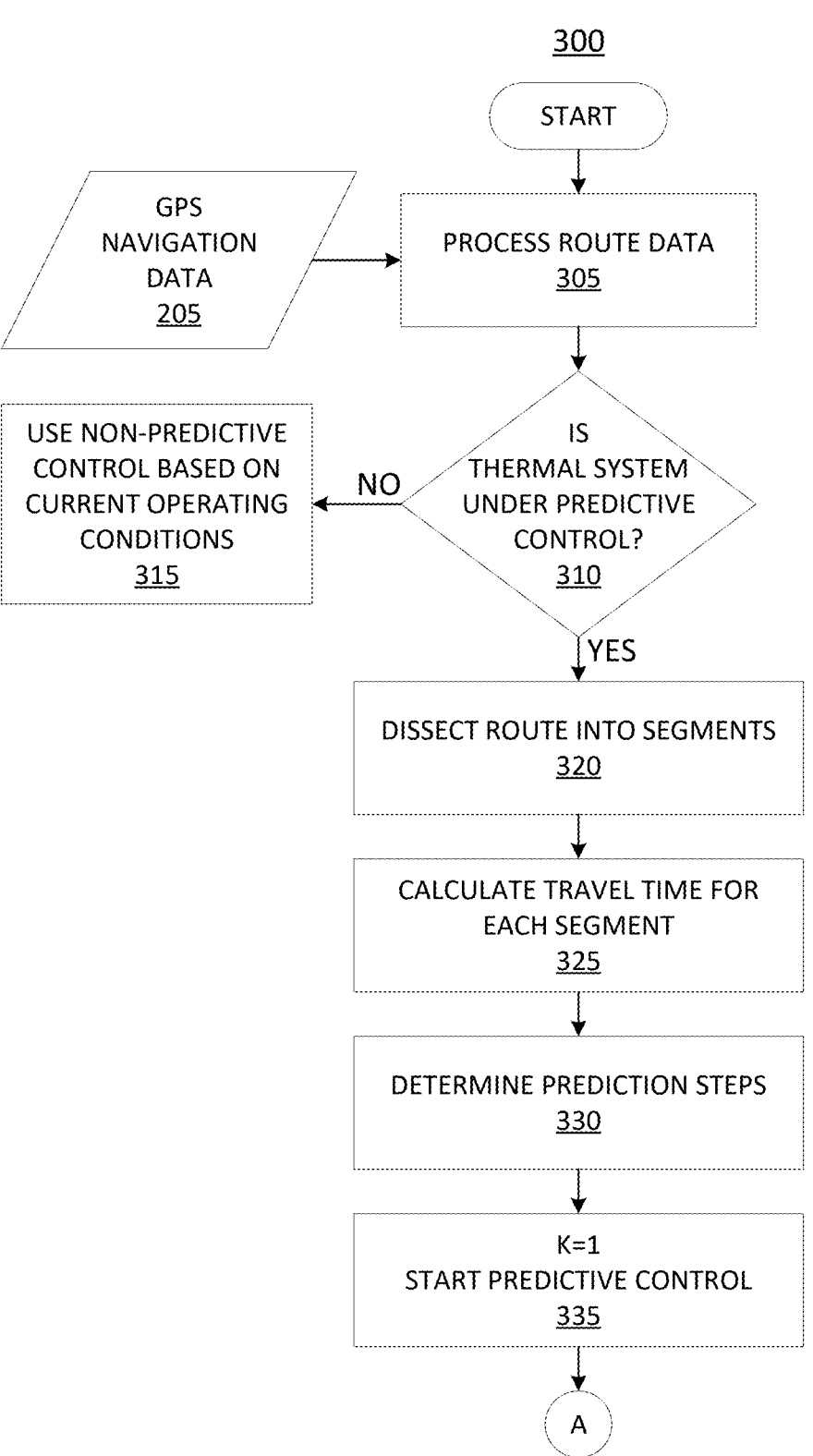
FIGS. 3A-3B illustrate a flowchart of a method for operating an electric drive cooling system, according to an exemplary embodiment of the present disclosure.
Figure 3B:
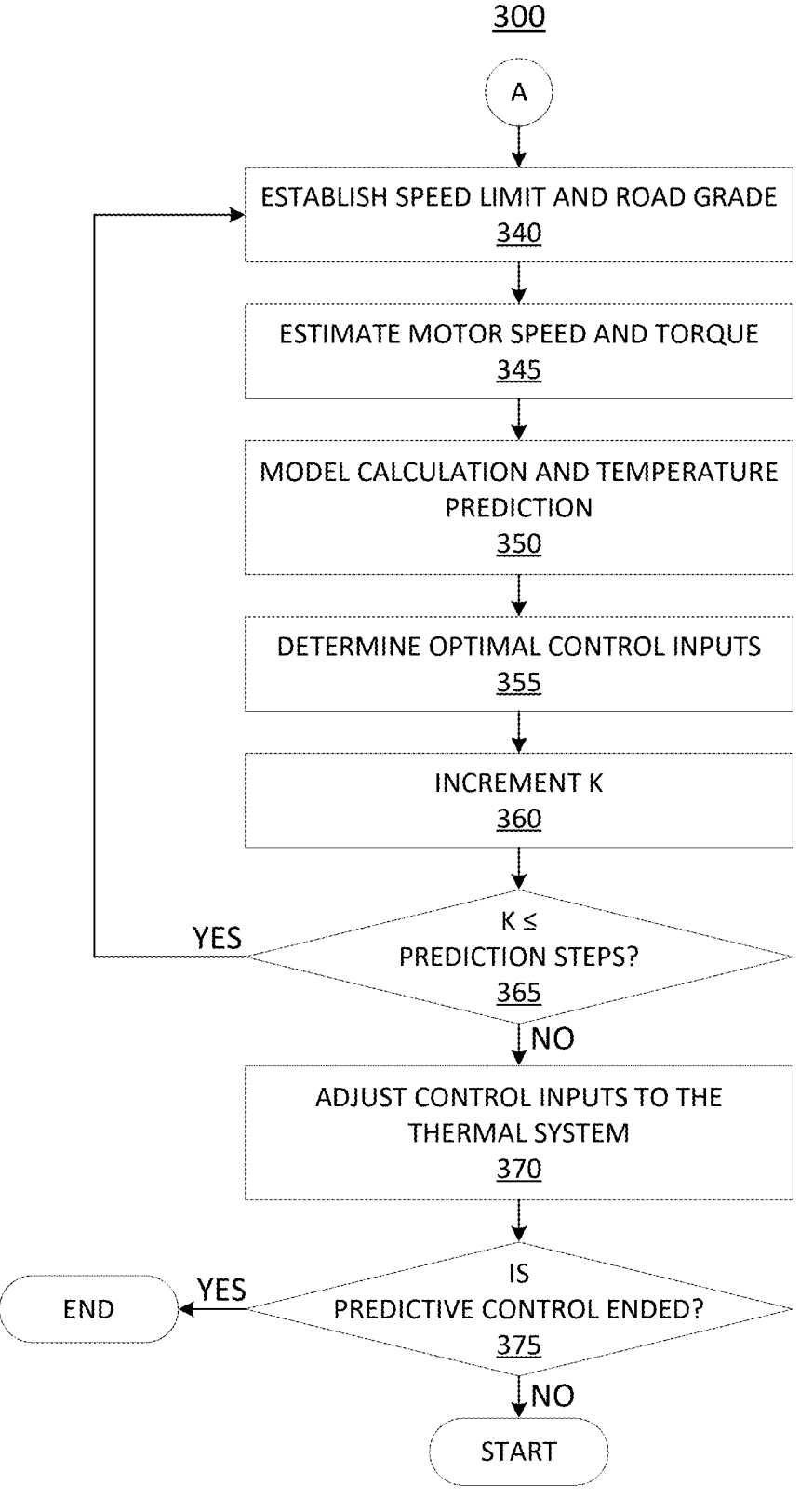

Referring now to FIGS. 3A-3B, a flowchart of a method 300 for operating an electric drive cooling system is illustratively depicted, in accordance with an exemplary embodiment of the present disclosure. According to an exemplary embodiment, the method may be configured to improve energy efficiency and increase EV range, improve component reliability, and lower total life cycle costs.

At 305, navigation/route data 205 may be processed in order to determine, at 310, whether the data is valid to be used for predictive control. According to an exemplary embodiment, data from the ADAS and/or the navigation data may be used to determine a route of the vehicle.

When the data is not valid to be used for predictive control, then, at 315, non-predictive control, based on current operating conditions, may be used. When the data is valid to be used for predictive control, then, at 320, the route may be dissected into individual segments.

For each segment, of the individual segments, travel time may be calculated, at 325, based, e.g., on constant vehicle speed and travel distance. From the travel time, a prediction horizon (e.g., one or more prediction steps), may be determined/generated/obtained, at 330, from an upcoming route segment (e.g., 100 seconds). According to an exemplary embodiment, the prediction horizon may be generated by, e.g., dividing the travel time into a number of prediction steps. At 335, prediction control may begin/start (where k, e.g., equals 1).

At 340, one or more road conditions (e.g., the speed limit and road grade information) may be established across the prediction horizon. According to an exemplary embodiment, the speed limit and grade information may be based upon, e.g., speed limit or elevation changes in a digital map applicable to the prediction horizon. It is noted, however, that the speed limit and grade information may be based on other suitable information, while maintaining the spirit and functionality of the present disclosure. At 345, the motor speed and torque across the prediction horizon may be estimated from the given speed limit and road grade information.

At 350, model calculations and temperature prediction may be performed. The prediction model (e.g., Equations 1-5) may be used to predict inverter, coil, oil, and/or coolant temperature profiles across the prediction horizon.

Since the power losses of motors and inverters are temperature dependent, the predicted temperature profiles from the prediction model may be used, at 355, to determine control inputs (e.g., EWP, EOP, cooling fan, and AAF inputs), based upon the cost function, to cause the EMs and PEs to function within a desired temperature range in order to achieve minimal power losses of motors and inverters for future driving conditions across the prediction horizon.

At 360, k may be incremented and, at 365, it may be determined whether k is less than or equal to a number of prediction steps in the prediction horizon. When k is less than or equal to the number of prediction steps in the prediction horizon, then, at 340, the speed limit and road grade information may be established across the prediction horizon. When k is not less than or equal to the number of steps in the prediction horizon, then, at 370, the control inputs to the electric drive cooling system may be adjusted. According to an exemplary embodiment, adjusting the control inputs to the electric drive cooling system may comprise delivering the new/adjusted control inputs to one or more thermal actuators, at appropriate times, as the vehicle traverses the prediction horizon so as to minimize power losses of inverters and motors, and also to minimize power consumption of the coolant pump, oil pump, and cooling fan. In the meantime, the commands may be adjusted, if needed (e.g., drivers may change vehicle speed dramatically or change route).

At 375, it may be determined whether predictive control has ended (e.g., when navigation signals are not available or when vehicle is off). When predictive control has ended, then the process may end. When predictive control has not ended, then, at 305, navigation/route data 205 may be processed in order to determine, at 310, whether the data is valid to be used for predictive control.

As a real-world example, when low load operations at high speeds are detected by the navigation look-ahead data, higher coil temperatures are desirable. Then, the predictive controller may promote heating of the system to save energy by running the pumps at their minimum speed while keeping the grille shutter closed and the cooling fan off. Also, vehicle aerodynamic drag may be reduced when the AAF is in a closed position, resulting in vehicle power consumption reduction.

Figure 4:
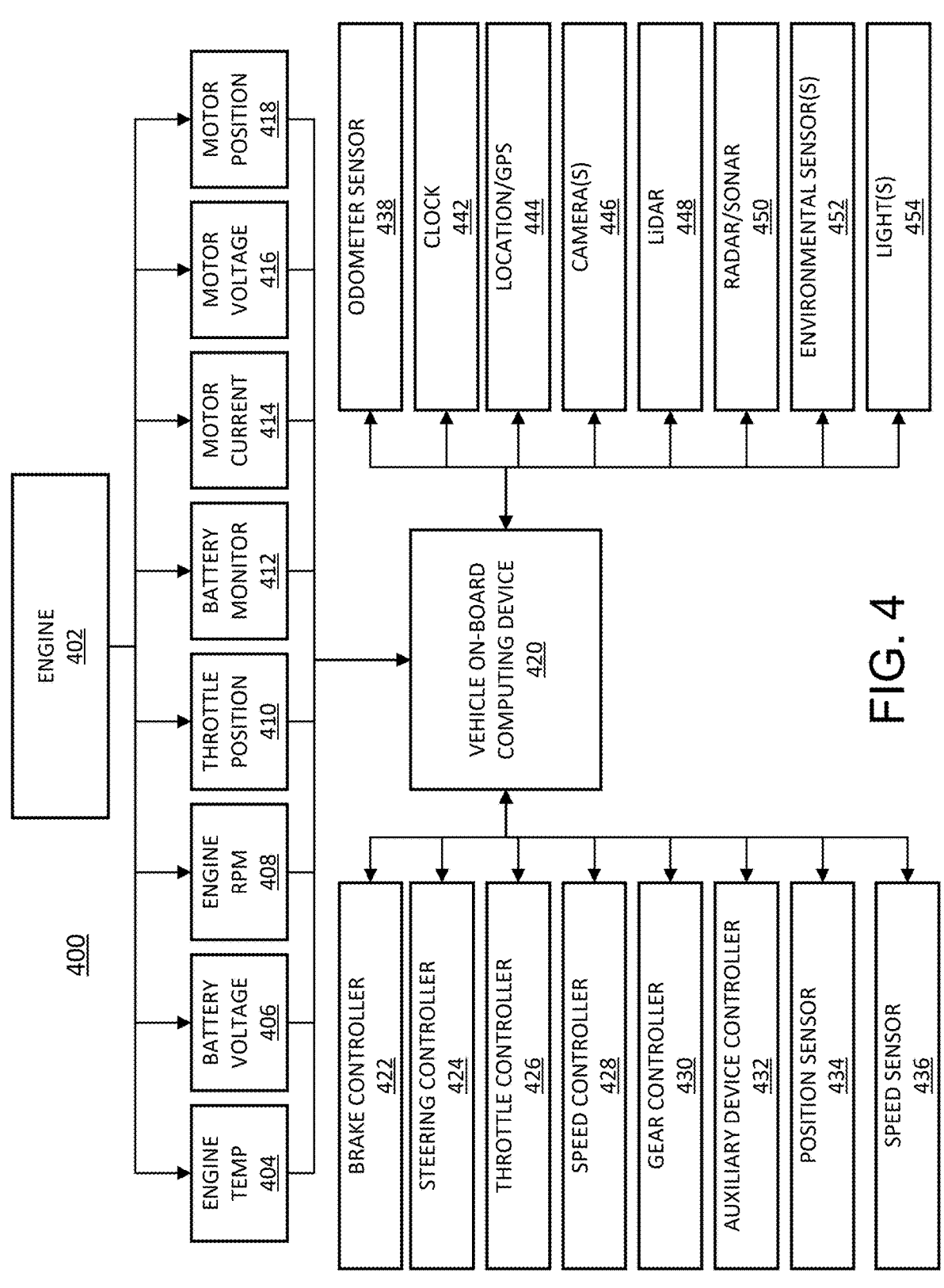
FIG. 4 illustrates an example architecture of a vehicle, according to an exemplary embodiment of the present disclosure.

Referring now to FIG. 4, an example vehicle system architecture 400 for a vehicle is provided, in accordance with an exemplary embodiment of the present disclosure. The following discussion of vehicle system architecture 400 is sufficient for understanding one or more components of vehicle 100.

As shown in FIG. 4, the vehicle system architecture 400 may comprise an engine, motor or propulsive device 402 and various sensors 404-418 for measuring various parameters of the vehicle system architecture 400. In gas-powered or hybrid vehicles having a fuel-powered engine, the sensors 404-418 may comprise, for example, an engine temperature sensor 404, a battery voltage sensor 406, an engine Rotations Per Minute (RPM) sensor 408, and/or a throttle position sensor 410. If the vehicle is an electric or hybrid vehicle, then the vehicle may comprise an electric motor, and accordingly may comprise sensors such as a battery monitoring system 412 (to measure current, voltage and/or temperature of the battery), motor current 414 and voltage 416 sensors, and motor position sensors such as resolvers and encoders 418.

Operational parameter sensors that are common to both types of vehicles may comprise, for example: a position sensor 434 such as an accelerometer, gyroscope and/or inertial measurement unit; a speed sensor 436; and/or an odometer sensor 438. The vehicle system architecture 400 also may comprise a clock 442 that the system uses to determine vehicle time and/or date during operation. The clock 442 may be encoded into the vehicle on-board computing device 420, it may be a separate device, or multiple clocks may be available.

The vehicle system architecture 400 may comprise various sensors that operate to gather information about the environment in which the vehicle is traveling. These sensors may comprise, for example: a location sensor 444 (for example, a Global Positioning System (GPS) device); object detection sensors such as one or more cameras 446; a LIDAR sensor system 448; and/or a radar and/or a sonar system 450. The sensors may comprise environmental sensors 452 such as, e.g., a humidity sensor, a precipitation sensor, a light sensor, and/or ambient temperature sensor. The object detection sensors may be configured to enable the vehicle system architecture 400 to detect objects that are within a given distance range of the vehicle in any direction, while the environmental sensors 452 may be configured to collect data about environmental conditions within the vehicle's area of travel. According to an exemplary embodiment, the vehicle system architecture 400 may comprise one or more lights 454 (e.g., headlights, flood lights, flashlights, etc.).

During operations, information may be communicated from the sensors to an on-board computing device 420 (e.g., computing device 130, computing device 500). The on-board computing device 420 may be configured to analyze the data captured by the sensors and/or data received from data providers and may be configured to optionally control operations of the vehicle system architecture 400 based on results of the analysis. For example, the on-board computing device 420 may be configured to control: braking via a brake controller 422; direction via a steering controller 424; speed and acceleration via a throttle controller 426 (in a gas-powered vehicle) or a motor speed controller 428 (such as a current level controller in an electric vehicle); a differential gear controller 430 (in vehicles with transmissions); and/or other controllers. The brake controller 422 may comprise a pedal effort sensor, pedal effort sensor, and/or simulator temperature sensor, as described herein.

Geographic location information may be communicated from the location sensor 444 to the on-board computing device 420, which may then access a map of the environment that corresponds to the location information to determine known fixed features of the environment such as streets, buildings, stop signs and/or stop/go signals. Captured images from the cameras 446 and/or object detection information captured from sensors such as LiDAR 448 may be communicated from those sensors to the on-board computing device 420. The object detection information and/or captured images may be processed by the on-board computing device 420 to detect objects in proximity to the vehicle. Any known or to be known technique for making an object detection based on sensor data and/or captured images may be used in the embodiments disclosed in this document.

Figure 5:
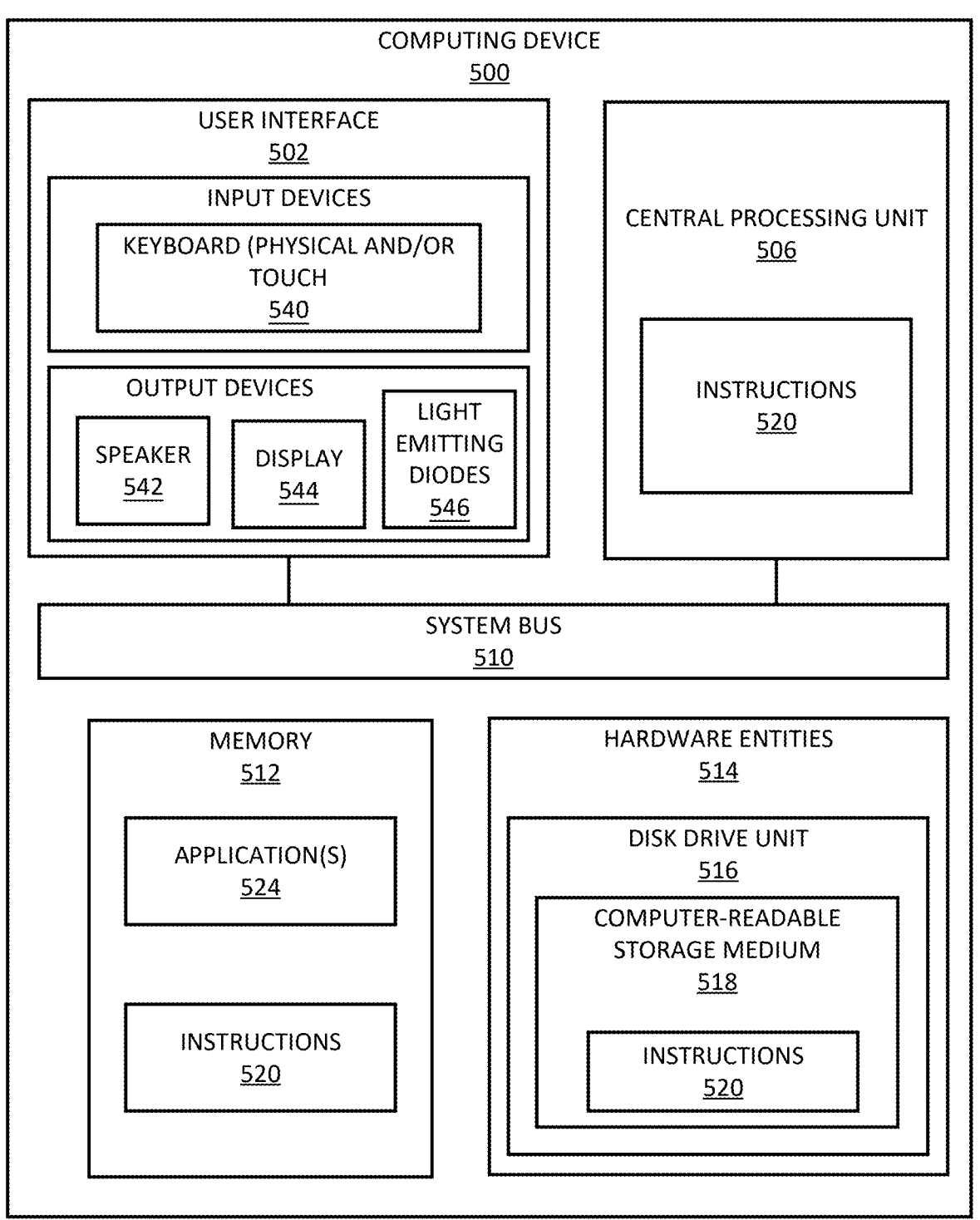
FIG. 5 illustrates example elements of a computing device, according to an exemplary embodiment of the present disclosure.

Referring now to FIG. 5, an illustration of an example architecture for a computing device 500 is provided. According to an exemplary embodiment, one or more functions of the present disclosure may be implemented by a computing device such as, e.g., computing device 500 or a computing device similar to computing device 500. Computing device 500 may be a quantum computer, a classical computer, and/or have one or more components configured to perform one or more quantum and/or classical computing functions. Computing device 130 may be an example of computing device 500 and/or may comprise one or more components of computing device 500.

The hardware architecture of FIG. 5 represents one example implementation of a representative computing device configured to implement at least a portion of the systems/devices (e.g., vehicle 100) and method(s)/control logic(s) (e.g., method 300) described herein.

Some or all components of the computing device 500 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 5, the computing device 500 may comprise a user interface 502 (e.g., a graphical user interface), a Central Processing Unit ("CPU") 506, a system bus 510, a memory 512 connected to and accessible by other portions of computing device 500 through system bus 510, and hardware entities 514 connected to system bus 510. The user interface may comprise input devices and output devices, which may be configured to facilitate user-software interactions for controlling operations of the computing device 500. The input devices may comprise, but are not limited to, a physical and/or touch keyboard 540. The input devices may be connected to the computing device 500 via a wired or wireless connection (e.g., a Bluetooth® connection). The output devices may comprise, but are not limited to, a speaker 542, a display 544, and/or light emitting diodes 546.

At least some of the hardware entities 514 may be configured to perform actions involving access to and use of memory \$12, which may be a Random Access Memory (RAM), a disk driver and/or a Compact Disc Read Only Memory (CD-ROM), among other suitable memory types. Hardware entities 514 may comprise a disk drive unit 516 comprising a computer-readable storage medium 518 on which may be stored one or more sets of instructions 520 (e.g., programming instructions such as, but not limited to, software code) configured to implement one or more of the methodologies, procedures, or functions described herein. The instructions 520 may also reside, completely or at least partially, within the memory 512 and/or within the CPU 506 during execution thereof by the computing device 500.

The memory 512 and the CPU 506 may also constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding, or carrying a set of instructions 520 for execution by the computing device 500 and that cause the computing device 500 to perform any one or more of the methodologies of the present disclosure.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A system for controlling vehicle energy efficiency, comprising:
an advanced driver assistance system (ADAS), comprising one or more imaging sensors, configured to image an environment of a vehicle;
a navigation sensor configured to collect navigation data pertaining to the vehicle; and
an electric drive cooling system, comprising:
a powertrain controller, comprising a processor and a memory;
one or more electric motors (EMs);
one or more power electronics (PEs); and
a temperature control system configured to adjust a temperature of the one or more EMs and the one or more PEs,
wherein the memory is configured to store instructions that, when executed by the processor, cause the processor to:
determine a route of the vehicle;
dissect the route of the vehicle into a plurality of segments;
calculate a travel time for each segment of the plurality of segments;
divide the travel time into a number of prediction steps, the prediction steps forming a prediction horizon;
establish one or more road conditions across the prediction horizon, based on the navigation data;
estimate EM motor speed and torque across the prediction horizon, based on the one or more road conditions;

estimate a temperature profile for the one or more EMs and the one or more PEs across the prediction horizon, based on the estimated EM motor speed and torque; and
determine one or more control inputs to the temperature control system to cause the one or more EMs and the one or more PEs to function within a desired temperature range;
wherein the n navigation comprises future road gradient and speed limit data for the vehicle; and
wherein the one or more road conditions comprise the future road gradient and speed limit data.

2. The system of claim 1, wherein the one or more imaging sensors comprise one or more imaging sensors selected from the following:
one or more cameras;
one or more LiDAR sensors; and
one or more radar sensors.

3. The system of claim 1, wherein the instructions, when executed by the processor, are further configured to cause the processor to determine whether the navigation data is valid to be used for predictive control.

4. The system of claim 1, wherein the temperature control system comprises one or more temperature control apparatuses selected from the following:
one or more coolant pumps;
one or more motor oil coolers;
one or more electric oil pumps;
one or more water condensers;
one or more radiators;
one or more 3-way valves;
one or more cooling fans; and
one or more active air flappers (AAFs).

5. The system of claim 4, wherein the determining the one or more control inputs comprises:
when a coolant temperate of a coolant passing through a 3-way valve, of the one or more 3-way valves, is above a temperature threshold, determining a control input to open the 3-way valve and allow coolant to pass through and into a radiator, of the one or more radiators, lowering the coolant temperature.

6. The system of claim 4, wherein the determining the one or more control inputs comprises:
determining a control input to activate the cooling fan and the AAF to regulate coolant temperature of a coolant.

7. The system of claim 1, wherein the route of the vehicle is based on data from the ADAS and the navigation data.

8. The system of claim 1, further comprising the vehicle.

9. The system of claim 8, wherein the ADAS, the navigation sensor, and the electric drive cooling system are coupled to the vehicle.

10. A method for controlling vehicle energy efficiency, comprising:
imaging an environment of a vehicle using an advanced driver assistance system (ADAS), comprising one or more imaging sensors;
collecting, using a navigation sensor, navigation data pertaining to the vehicle; and
using an electric drive cooling system:
determining a route of the vehicle;
dissecting the route of the vehicle into a plurality of segments;
calculating a travel time for each segment of the plurality of segments;
dividing the travel time into a number of prediction steps, the prediction steps forming a prediction horizon;

establishing one or more road conditions across the prediction horizon, based on the navigation data;

estimating electric motor (EM) motor speed and torque across the prediction horizon, based on the one or more road conditions;

estimating a temperature profile for one or more EMs and one or more power electronics (PEs) across the prediction horizon, based on the estimated EM motor speed and torque; and determining one or more control inputs to the temperature control system to cause the one or more EMs and the one or more PEs to function within a desired temperature range, wherein the electric drive cooling system comprises:

a powertrain controller, comprising a processor and a memory;

the one or more EMs;

the one or more PEs; and a temperature control system configured to adjust a temperature of the one or more EMs and the one or more Pes;

wherein the navigation data comprises future road gradient and speed limit data for the vehicle; and wherein the one or more road conditions comprise the future road gradient and speed limit data.

11. The method of claim 10, wherein the one or more imaging sensors comprise one or more imaging sensors selected from the following:

one or more cameras;

one or more LiDAR sensors; and one or more radar sensors.

12. The method of claim 10, further comprising, using the electric drive cooling system, determining whether the navigation data is valid to be used for predictive control.

13. The method of claim 10, wherein the temperature control system comprises one or more temperature control apparatuses selected from the following:

one or more coolant pumps;

one or more motor oil coolers;

one or more electric oil pumps;

one or more water condensers;

one or more radiators;

one or more 3-way valves;

one or more cooling fans; and one or more active air flappers (AAFs).

14. The method of claim 13, wherein the determining the one or more control inputs comprises:

when a coolant temperate of a coolant passing through a 3-way valve, of the one or more 3-way valves, is above a temperature threshold, determining a control input to open the 3-way valve and allow coolant to pass through and into a radiator, of the one or more radiators, lowering the coolant temperature.

15. The method of claim 13, wherein the determining the one or more control inputs comprises:

determining a control input to activate the cooling fan and the AAF to regulate coolant temperature of a coolant.

16. The method of claim 10, wherein the route of the vehicle is based on data from the ADAS and the navigation data.

* * * * *